US006366948B1

(12) United States Patent
Teibel

(10) Patent No.: US 6,366,948 B1
(45) Date of Patent: Apr. 2, 2002

(54) CHAT DISTRIBUTION SERVICE SYSTEM FOR ALTERNATIVELY DELIVERING THE URL LINKED TO A MESSAGE DETERMINED BY THE CHAT CLIENT DEVICE TO BE UNSUITABLE FOR DISTRIBUTION

(75) Inventor: Dan A. Teibel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/216,554

(22) Filed: Dec. 18, 1998

(51) Int. Cl.[7] ................... G06F 15/16; G06F 13/00
(52) U.S. Cl. ............... 709/204; 709/205; 709/232; 345/751; 345/759
(58) Field of Search .................... 709/201–206, 709/217–219, 314, 315, 230–233; 348/552; 707/10, 501; 345/970, 329, 972, 971, 751, 759; 725/32, 34; 370/312, 432, 486

(56) References Cited

U.S. PATENT DOCUMENTS

| 5,764,916 A | * | 6/1998 | Busey et al. ............. 709/227 |
| 5,796,393 A | * | 8/1998 | MacNaughton et al. .... 345/329 |
| 5,923,846 A | * | 7/1999 | Gage et al. ............... 709/213 |
| 5,956,491 A | * | 9/1999 | Marks ..................... 709/250 |
| 6,020,884 A | * | 2/2000 | MacNaughton et al. .... 345/329 |
| 6,134,582 A | * | 10/2000 | Kennedy ................. 709/206 |
| 6,145,084 A | * | 11/2000 | Zuili et al. ............... 713/201 |
| 6,175,877 B1 | * | 1/2001 | Zerber .................... 709/310 |
| 6,272,214 B1 | * | 8/2001 | Jonsson .................. 379/202 |

OTHER PUBLICATIONS

Building Task–Specific Interfaces to High Volume Conversational Data, Terveen, L. Hill, W. Amento, B. McDonald, D., and Creter, J. AT&T Labs–Research, ACM 0–89791–802–9/97/03, pp. 226–240.*
The Case for Desing using the World Wide Web, Silva, M. Katz, R., Computer Science Div. Univ. of California, Berkeley, ACM 0–89791–786–1/95/0006, (Annual ACM IEEE Design Automation Conference, held Jun. 12–16, 1995), 7 pages.*
Virtual Meetings with Desktop Conferencing, Dutta–Roy, A. IEEE Spectrum, 0018–9235, Jul., 1998, pp. 47–56.*
Building Real–Time Groupware with Groupkit, A Groupware Toolkit, Roseman, M., Greenberg, S., ACM 1073–0516/96/0300–0066, vol. 3, No. 1, Mar. 1996, pp. 66–106.*

* cited by examiner

Primary Examiner—Le Hien Luu
Assistant Examiner—Beatriz Prieto
(74) Attorney, Agent, or Firm—Steven D. Yates

(57) ABSTRACT

A method of sending messages from a first chat client in a chat group to multiple other clients in the chat group comprises storing a first message on a first server, the first message not suitable for efficient multiple distribution from the first client to the other clients, and transmitting to the other clients a first signal comprising the location of the first message on the first server.

15 Claims, 4 Drawing Sheets

CHAT DISTRIBUTION SERVICE SYSTEM FOR ALTERNATIVELY DELIVERING THE URL LINKED TO A MESSAGE DETERMINED BY THE CHAT CLIENT DEVICE TO BE UNSUITABLE FOR DISTRIBUTION

BACKGROUND

1. Field

The present invention relates to electronic information exchange and, more particularly, to electronic information exchange using a chat system.

2. Background Information

Network chat systems provide a way for multiple users (also called chat participants or parties) to meet online to exchange interactive messages. A collection of chat participants is called a chat group. Current chat implementations often employ a central server, called a chat server. These implementations may experience performance problems as more users join one or more chat groups hosted by the chat server. For example, if the chat server fails, no message exchange may occur between chat participants using that server. Current implementations may also employ expensive hardware and a dedicated network connection for the chat server, because the chat server is typically powerful enough to handle many concurrent participants, with access provided at any time of day.

Other existing chat implementations bypass the chat server by forwarding the content of each new message from a chat participant to all other participants in the chat group. This may be suitable for certain messages, such as short text messages, but may not work well when the content of the messages is too large or complicated for efficient distribution from the chat participants' computers. Multimedia content such as audio or video is an example of content which may be unsuitable for efficient multiple distribution from the chat participants' computers. Slow dial-up connections to the network may exacerbate the problem of multiple distribution of such content.

SUMMARY

A method of sending messages from a chat client in a chat group to multiple other clients in the chat group includes storing a message on a server, the message not suitable for efficient multiple distribution from the client to the other clients. A signal is transmitted to the other clients indicating the location of the message on the server.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may be further understood by reference to the following detailed description when read with the accompanying drawings.

DETAILED DESCRIPTION

Figure 1:
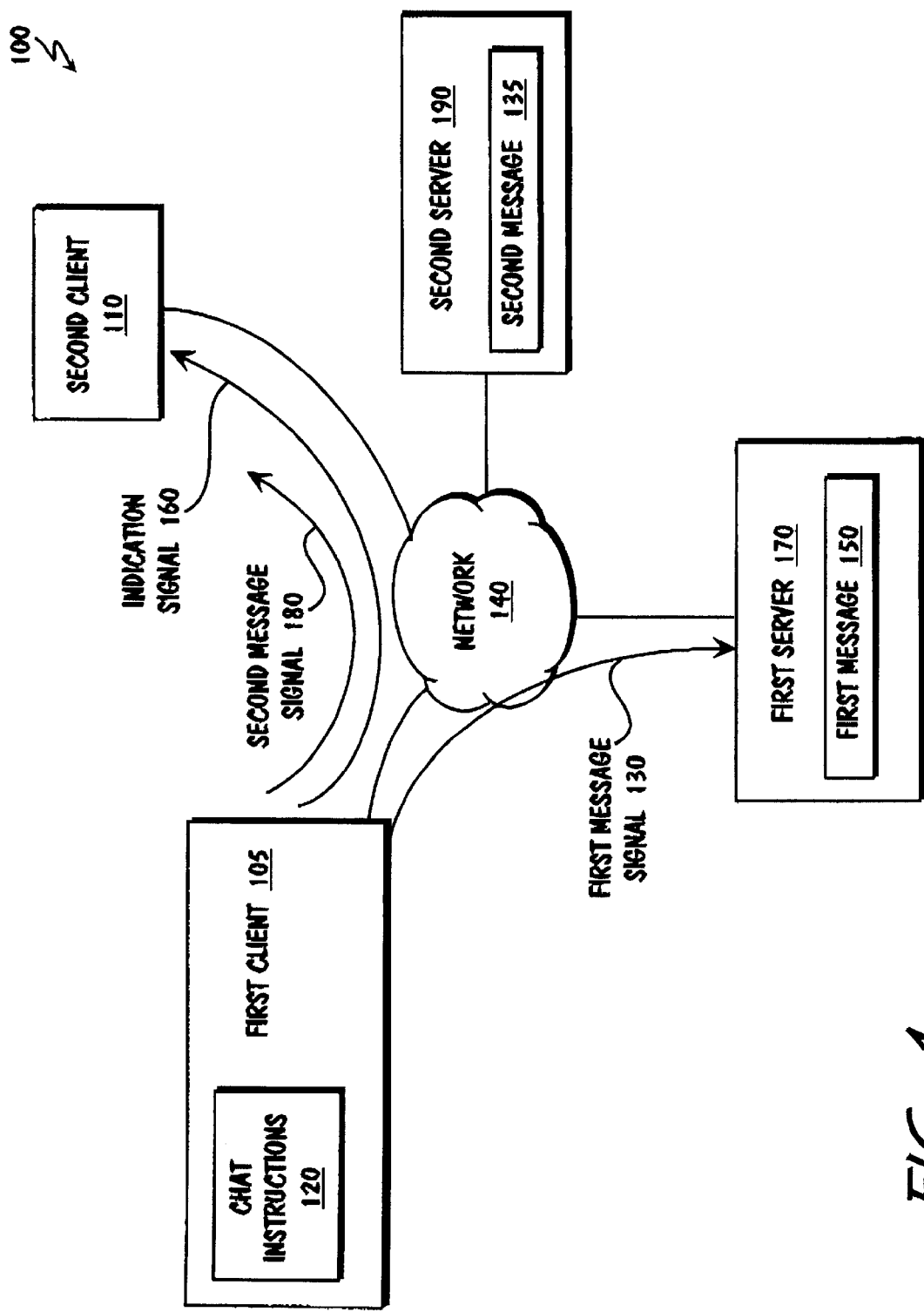
FIG. 1 is a schematic diagram illustrating an embodiment of a chat system in accordance with the present invention.

The embodiments described herein enable a chat system with several desirable features. For example, some embodiments in accordance with the invention may be implemented without a chat server or the installation of a dedicated Internet connection by one or more members of the chat group. The embodiments described herein are merely illustrative, and one skilled in the art will appreciate that numerous modifications can be made which nonetheless fall within the scope of the present invention.

In one embodiment, a message to be sent from one chat participant to the others is evaluated. If the message meets certain criteria which make it less suitable for multiple distribution from a chat participant's client device, the sending participant may store the message on a server, such as the server hosting the sending participant's home page or other personal data. Examples of message less suitable for multiple distribution from the client device include messages exceeding a threshold value in size, and messages which are not text (which tend to be large in size or employ special transmission protocols, such as audio and video streaming protocols). Such messages require large amounts of bandwidth and reliability of transfer between the client and the network, which may not be available on, for example, slow dial-up connections. Once the message is stored on a server, the client machine associated with the sending participant signals the client machines of each other participant in the chat group with an indication of how to locate the message on the server. Receipt of this signal may result in the client machine of other participants reading the message from the server.

Chat group participants typically have access to an Internet Service Provider (ISP), home page service, or other web server capable of hosting the participant's web pages or other personal data. For example, many ISPs provide a service by which subscribers have access to an area of the ISP's servers on which the participant may store personal information, such as a home page or other personal data. In one embodiment, a participant device in the chat group may store within the participant's associated personal data area on a server messages which are unsuitable for efficient multiple distribution from the client device. The home page area or other personal data area of a particular participant may typically only be written with information from that particular participant; other participants in the chat group (or other parties who are online and not members of the chat group) will typically not have write privileges to a particular participant's personal data area. These others typically will, however, have read privileges to the information stored in the personal data area of a particular participant.

Examples of messages unsuitable for efficient multiple distribution from a client may include messages which are not text, or messages exceeding a threshold value in size. The client machine associated with the sending participant may signal the client machines of other participants in the chat group with an indication of how to locate the message on the server. Receipt of this signal and indication may result in the client machine of the other participants reading the message from the server.

As a result, the multiple distribution of selected messages may be accomplished from the server, which may be coupled to the network with a higher bandwidth, more reliable and better quality connection than is the sending participant's device. Each other participant in the chat group may then receive the message sooner than if multiple distribution of the message were accomplished from the sending client's device.

Referring now to FIG. 1, a schematic diagram illustrating an embodiment 100 of a chat system is shown. Clients 105 and 110 are coupled by way of a network 140 to servers 170 and 190. In one embodiment, clients establish a dial-up connection with an ISP to open a communication channel on the network 140, although techniques other than dial-up for opening a communication channel are possible within the scope of the invention. For example, clients coupled to a corporate intranet may open a communication channel on the network 140 by executing a web browser application.

In embodiment 100, the clients 105 and 110 typically represent any data processing device comprising a processor capable of executing instructions, a bus coupled to the processor to supply the instructions to the processor, and a storage medium to store the instructions to be executed by the processor. For example, a personal computer, handheld computer, or information appliance (such as a set-top Internet device) may be employed.

In one embodiment, the clients 105 and 110 comprise personal computers (PCs) including an Intel Corporation Pentium® or compatible processor, although the invention is not limited in scope in this respect.

In embodiment 100, the client 105 is shown comprising chat instructions 120. The chat instructions 120 include sequences of instructions stored on the client 105 to implement an embodiment of a chat system as described below.

The servers 170 and 190 are data processing devices comprising special hardware and software which enables programs and data stored on the servers to be accessed over the network 140 by clients 105 and 110. For example, the servers may comprise computers running a variant of the UnixT™ operating system, or the Windows® NT® Server operating system from Microsoft Corporation. The technical differences that distinguish client and server devices are well-known in the art and to elaborate in detail would only obscure the description of the present invention.

When each participant already has the privilege of having a home page or other personal data area on the ISP server or through some other arrangement or situation, an economical embodiment of a chat system may be possible by using those web servers to forward chat messages. In another embodiment, the servers 170 and 190 may be provided by a home page service such as GeoCities, Inc. The servers could also be provided by a combination of ISPs, home page services, and other arrangements or situations.

In one embodiment of the invention, when the message 150 is less suitable for multiple distribution from the client device, for example messages exceeding a threshold value in size and messages which are multimedia, the chat instructions 120 may cause client 105 to store the message 150 on the server 170. In like manner, the client 110 may store a message 135 on the server 190. In one embodiment this is accomplished using the Internet File Transfer Protocol (FTP). Other well known protocols for this purpose include the Hyper Text Transfer Protocol (HTTP) and various remote file system protocols, although the invention is not restricted to any particular protocol.

Various criteria may be employed when evaluating the suitability of the message for multiple distribution from the client device. Criteria may include the available network bandwidth between client 105 and the network 140, transmission data rate capability of client 105, the computational resources available to client 105, and many other factors. One consideration is the number of other participants in the chat group to which the message may be distributed. The more participants, the longer it may take client 105 to distribute the message. The invention is not limited to any particular evaluation criteria.

In one embodiment, when message 150 is stored on server 170, the chat instructions 120 send an indication signal 160 to client 110. The indication signal 160 may comprise information on how to locate message 150 on server 170. This information may, in one embodiment, may comprise one or more Internet Uniform Resource Locators (URLs). The manner in which URLs identify information on a network is well known in the art and, in the interest of not obscuring the present invention, is not recited here. Again, this is only one embodiment, and the invention is not limited in scope in this respect.

Receipt of indication signal 160 results in client 110 reading message 150 from server 170. In one embodiment, message 150 is read using FTP. Other embodiments may, for example, use HTTP or various remote file system protocols although again, the invention is not limited to a particular protocol.

Likewise, receipt of an indication signal by client 105 from client 110 may result in chat instructions 120 instructing client 105 reading message 135 from server 190.

When the message 150 is suitable for multiple distribution from the client 105 to other chat participants, for example messages not exceeding a threshold value in size and short text messages, the chat instructions 120 may instruct client 105 to transmit a message signal 180 to client 110. The message signal 180 may comprise the message and may be transmitted, in only one of many embodiments, using Transmission Control Protocol/Internet Protocol (TCP/IP).

In one embodiment, a participant may post multimedia messages to a web server, then signal other participants in the chat group with the web server's URL. The web server may comprise a server provided by the client's ISP, online community, or web page hosting service, among numerous possibilities. The bandwidth- and computationally-intensive task of forwarding multimedia data to multiple participants is transferred from the chat clients to multiple web servers. In this embodiment, text or other small messages may be forwarded directly to the other participants from the client device, without the use of a server.

Chat groups with limited resources, such as small and nonprofit groups, may implement chat systems without purchasing chat server hardware and without installing a dedicated Internet connection. Instead, these groups may use the web servers provided by their ISP, hosting service, or online community, among numerous possibilities. If a participant's associated web server fails, that participant is disabled from sending multimedia messages, but otherwise the chat system operates properly.

A large number of users may participate in a chat system without causing a bottleneck when each participant's associated web server contributes to the computing resources of the chat system.

Figure 2:
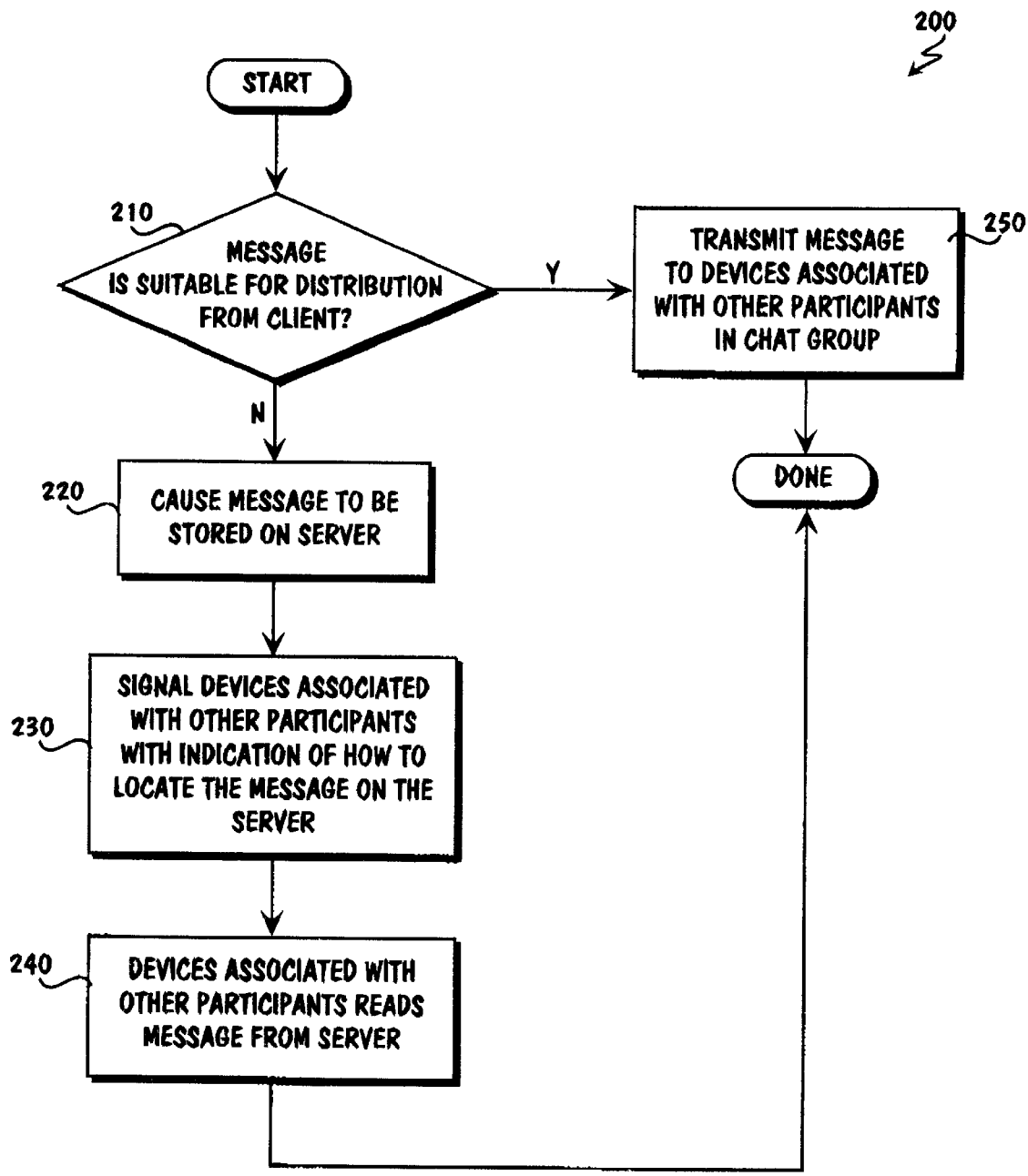
FIG. 2 is a flowchart illustrating one embodiment of a method to implement a chat system in accordance with the present invention.

Referring now to FIG. 2, a flowchart 200 illustrating one embodiment of a method to implement a chat system is shown. At 210, a determination is made whether a message to be transmitted from one chat participant to other chat participants in a chat group is suitable for multiple distribution from the client. If the message is suitable for multiple distribution, it is transmitted at 250 to client devices associated with other participants in the chat group. Otherwise, at 220 the message is stored on a server. The client devices associated with the other participants are signaled with an indication of how to locate the message on the server at 230. At 240, the client devices associated with the other participants read the message from the server.

The client devices, server, message, and signal may comprise but are not limited to any of the possible embodiments described with respect to FIG. 1. For example, in one embodiment the clients comprise PCs, the server is a web server providing the home page or other personal data area of the participant sending the message, and the indication of how to locate the message comprises a URL.

Embodiments of a chat system in accordance with the present invention may operate in a "hybrid" fashion, with qualities of both centralized and peer-to-peer techniques. Instead of employing a central chat server, or causing all messages to be transmitted from each client to every other, each participant is responsible for storing messages on a network server associated with that participant when the message is not suitable for multiple distribution. When the message is suitable for multiple distribution, it is transmitted directly from the client to the others. The chat system demonstrates hybrid behavior, employing the server for certain messages and transmitting the messages directly in other cases.

Figure 3:
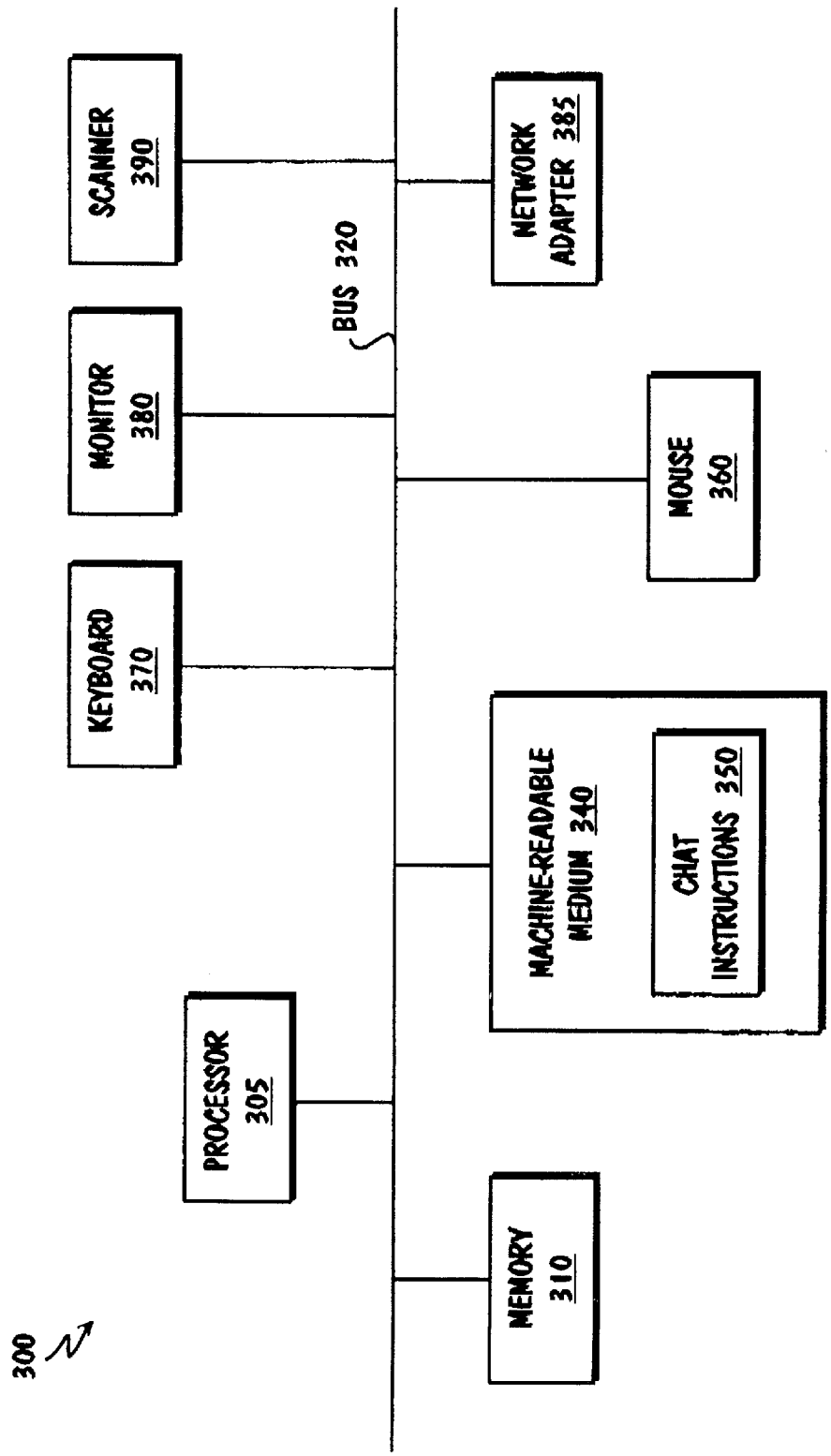
FIG. 3 is a schematic diagram illustrating an embodiment of a data processing device to implement an embodiment of a chat system in accordance with the present invention.

FIG. 3 is a schematic diagram illustrating an embodiment 300 of a data processing device to implement an embodiment of a chat system in accordance with the present invention. Referring now to FIG. 3, embodiment 300 comprises a processor 305 to execute instructions supplied from a bus 320. The executed instructions are stored in a memory 310 from which they are supplied to the processor 305 by the bus 320 for execution. The processor 305 may execute any instruction set including, but not limited to, instruction sets supported by an Intel Corporation Pentium® or compatible processor. The bus 320 may be implemented using technologies for propagating signals including, but not limited to, electronic and optical conductors. The memory may include random access memory (RAM), read-only memory (ROM), or any other form of memory capable of storing instructions which may then be supplied to the processor 305 by the bus 320 for execution. Embodiment 300 may include a machine-readable storage medium 340 to store sequences of instructions which may be loaded into volatile memory 310 from which they may be supplied to processor 305 for execution. The machine-readable storage medium 340 may include, but is not limited to, a hard drive, a floppy drive, and a CD-ROM or other optical disk.

One skilled in the art will appreciate that in "diskless" devices without mass storage mediums, the machine-readable storage medium 340 may be omitted from the embodiment 300. Instructions, including chat instructions 350, may then be stored in RAM, ROM, or other memory from which instructions may be directly accessed over the bus 320 by the processor 305 for execution.

To perform signal input/output, embodiment 300 comprises a mouse 360, a keyboard 370, a display 380, and a scanner 390, each coupled to the bus 320 for transmitting data so that it may be easily accessed or manipulated by a user. The embodiment 300 further includes a network adapter 385 to couple the embodiment 300 to a network. Those skilled in the art will appreciate that for devices which perform dial-up access to the network, a modem may be disposed in place of or in addition to the network adapter 385. Of course, the invention is not limited in scope to this particular embodiment.

Embodiment 300 is shown storing chat instructions 350 on the machine-readable storage medium 340. The chat instructions include sequences of instructions that when executed may result in performance of a method embodiment such as the one illustrated in FIG. 2. These instruction sequences are further illustrated in FIG. 4.

Figure 4:
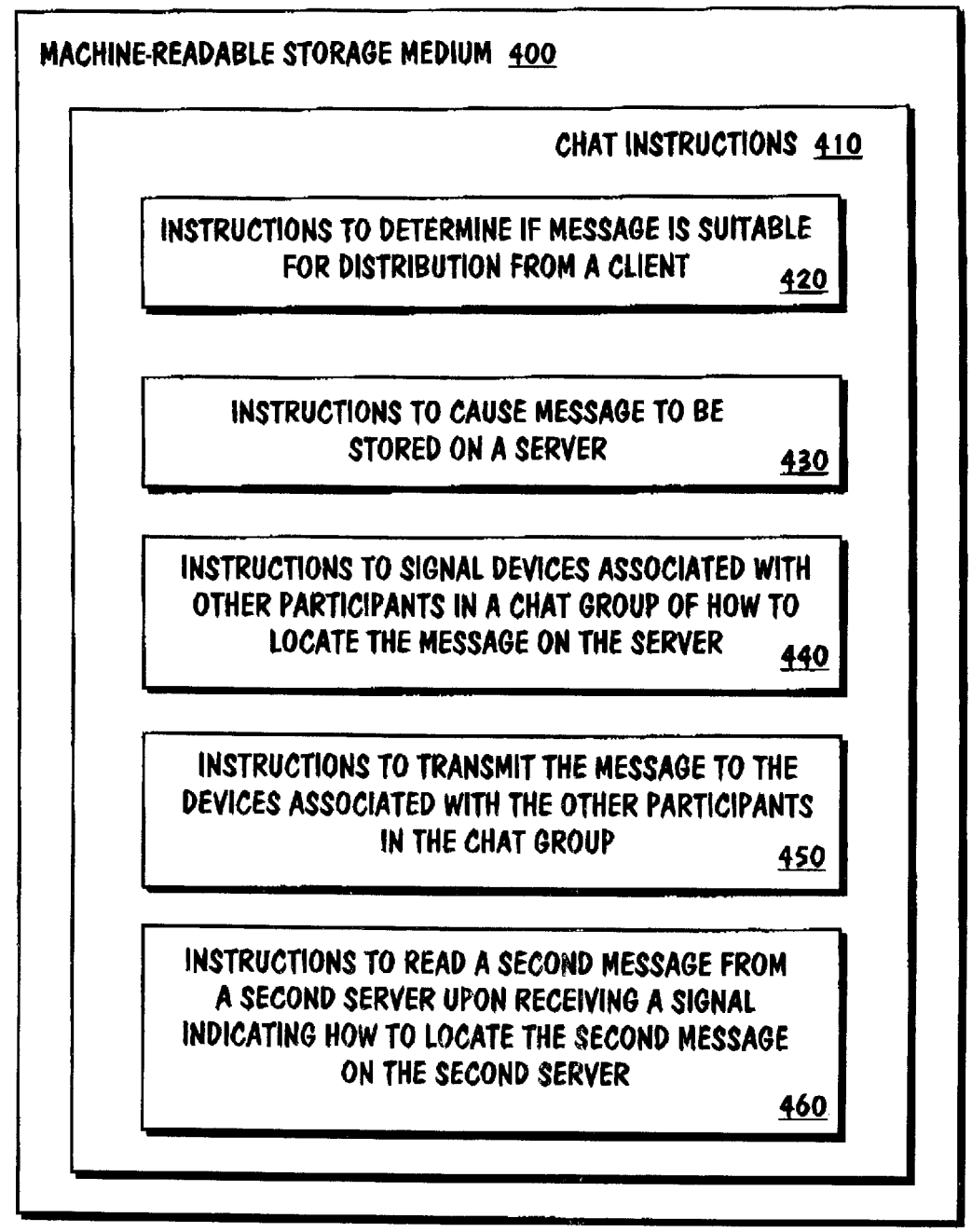
FIG. 4 is a schematic diagram illustrating an embodiment of a machine-readable storage medium comprising a sequence of instructions to implement an embodiment of a chat system in accordance with the present invention.

FIG. 4 is a schematic diagram illustrating an embodiment 400 of a machine-readable storage medium comprising a sequence of instructions to implement an embodiment of a chat system in accordance with the present invention. Referring now to FIG. 4, the machine-readable storage medium 400 may comprise RAM, ROM, a floppy disk, and hard disk, a CD ROM, or any other memory capable of storing sequences of instructions which may be executed by a data processing device such as, for example the device embodiment illustrated in FIG. 3. In this particular embodiment, the chat instructions comprise sequences of instructions to carry out an embodiment of the method of FIG. 2, including but not limited to: instructions 420 to determine if a message is suitable for distribution from a client; instructions 430 to store the message on a first server; instructions 440 to signal devices associated with other participants in the chat group on how to locate the message on the first server; instructions 450 to transmit the message to devices associated with the other participants in the chat group; and instructions 460 to cause the first client to read a message from a second server upon receiving an indication from another participant in the chat group indicating how to locate the message on the second server. Of course, the invention is not limited in scope to this particular embodiment, and the machine-readable medium 400 may comprise additional sequences of instructions in addition to those shown.

The manners of producing the machine-readable storage medium 400 storing sequences of instructions, such as chat instructions 410, are well known in the art and to elaborate in detail would merely obscure the description of the present invention.

In summary, embodiments of an advantageous chat system have been disclosed. In one embodiment, a message to be sent from one chat participant to the others is evaluated against certain criteria which make it less suitable for distribution to all chat participants from the client. When the message is unsuitable for distribution from the client, the sending participant can store the message on a server, such as the server providing the sending participant's home page or other personal data area. The client machine associated with the sending participant signals the client machines of each other participant in the chat group with an indication of how to locate the message on the server. Receipt of this signal and indication results in the client machine of each of the other participants to read the message from the server.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method of sending messages from a first chat client in a chat group to multiple other clients in the chat group, the method comprising:

the first chat client determining if a first message is suitable for efficient multiple distribution from the first chat client in the chat group to other clients in the chat group;

if the first message is not suitable for efficient multiple distribution from the first chat client to the other clients:
the first chat client causing the first message to be stored on a first server; and
transmitting to the other clients a first signal comprising the location of the first message on the first server.

2. The method of claim 1 further comprising:
for each of the other clients, the first chat client transmitting a second message, the second message suitable for efficient multiple distribution from the first chat client to the multiple other clients.

3. The method of claim 1 in which causing a first message to be stored on a first server further comprises:
causing the first message to be stored on the first chat client's personal data area on a web server.

4. The method of claim 1 in which transmitting to the other clients a first signal comprising the location of the first message on the first server further comprises:
transmitting to the other clients a Uniform Resource Locator comprising the location of the first message on the first server.

5. The method of claim 1 further comprising:
the first chat client reading a second message from a personal data area of the chat client of the chat group, the personal data area comprised by a web server, the first chat client reading the second message upon receiving a second signal from the chat client of the chat group, the second signal comprising the location of the second message on the web server.

6. A device comprising:
a processor;
a machine-readable storage medium coupled to the processor by way of a bus, the storage medium storing a sequence of instructions which, when executed by the processor, cause the device to:
when the device is operated as the first chat client in a chat group, determine if a first message is suitable for efficient multiple distribution from the device to other clients in the chat group;
if the first message is not suitable for efficient multiple distribution from the first chat client to the other clients:
causing the first message to be stored on a first server; and
transmitting to the other clients a first signal comprising the location of the first message on the first server.

7. The device of claim 6 in which the sequence of instructions, when executed by the processor, further cause the device to:
for each of the other clients, transmit a second message, the second message suitable for efficient multiple distribution from the device to the other clients.

8. The device of claim 6 in which the sequence of instructions, when executed by the processor, further cause the device to:
cause the first message to be stored on the first chat client's personal data area on a web server.

9. The device of claim 6 in which the first signal comprises a Uniform Resource Locator.

10. The device of claim 6 in which the sequence of instructions, when executed by the processor, further cause the device to:
read a second message from a personal data area of the chat client of the chat group, the personal data area comprised by a web server, the first chat client reading the second message upon receiving a second signal from the chat client of the chat group, the second signal comprising the location of the second message on the web server.

11. An article comprising:
a machine-readable medium having stored thereon a sequence of instructions which, when executed by a data processing device, cause the data processing device to:
when the device is operated as the first chat client in a chat group, determine if a first message is suitable for efficient multiple distribution from the device to other clients in the chat group;
if the first message is not suitable for efficient multiple distribution from the first chat client to the other clients:
causing the first message to be stored on a first server; and
transmitting to the other clients a first signal comprising the location of the first message on the first server.

12. The article of claim 11 in which the sequence of instructions, when executed by a data processing device, further cause the data processing device to:
for each of the other clients, transmit a second message, the second message suitable for efficient multiple distribution from the device to the other clients.

13. The article of claim 11 in which the sequence of instructions, when executed by a data processing device, further cause the data processing device to:
cause the first message to be stored on the first chat client's personal data area on a web server.

14. The article of claim 11 in which the first signal comprises a Uniform Resource Locator.

15. The article of claim 11 in which the sequence of instructions, when executed by a data processing device, further cause the data processing device to:
read a second message from a personal data area of the chat client of the chat group, the personal data area comprised by a web server, the first chat client reading the second message upon receiving a second signal from the chat client of the chat group, the second signal comprising the location of the second message on the web server.

* * * * *

UNITED STATES PATENT AND TRADEMARK OFFICE
CERTIFICATE OF CORRECTION

PATENT NO.    : 6,366,948 B1
DATED         : April 2, 2002
INVENTOR(S)   : Teibel It is certified that error appears in the above-identified patent and that said Letters Patent is hereby corrected as shown below:

<u>Column 3,</u>
Line 39, delete "UnixT™", insert -- Unix™ --.

Signed and Sealed this

Fifteenth Day of October, 2002

Attest:

Attesting Officer

JAMES E. ROGAN
*Director of the United States Patent and Trademark Office*